(12) United States Patent
Xi et al.

(10) Patent No.: US 8,928,300 B2
(45) Date of Patent: Jan. 6, 2015

(54) CONTROL CIRCUITS FOR SWITCHING POWER CONVERTERS AND ASSOCIATED METHODS

(75) Inventors: Xiaoyu Xi, Chengdu (CN); Paul Ueunten, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 153 days.

(21) Appl. No.: 13/542,509

(22) Filed: Jul. 5, 2012

(65) Prior Publication Data

US 2013/0009617 A1   Jan. 10, 2013

(30) Foreign Application Priority Data

Jul. 4, 2011   (CN) .......................... 2011 1 0185265

(51) Int. Cl.
*H02M 3/156*   (2006.01)

(52) U.S. Cl.
CPC ..................................... *H02M 3/156* (2013.01)
USPC .......................................................... 323/282

(58) Field of Classification Search
CPC .............................. H02M 3/156; H02M 3/155
USPC ......... 323/271, 222, 282, 283, 285, 288, 284, 323/259, 242
See application file for complete search history.

(56) References Cited

U.S. PATENT DOCUMENTS

| 6,515,880 | B1* | 2/2003 | Evans et al. | 323/222 |
| 2003/0020442 | A1* | 1/2003 | Hwang | 323/288 |
| 2008/0290846 | A1* | 11/2008 | Kanouda et al. | 323/222 |
| 2010/0079123 | A1* | 4/2010 | Miyamae | 323/282 |
| 2010/0164570 | A1* | 7/2010 | Priego | 327/157 |
| 2013/0038310 | A1* | 2/2013 | Menegoli et al. | 323/288 |

* cited by examiner

*Primary Examiner* — Gary L Laxton
*Assistant Examiner* — Trinh Dang
(74) *Attorney, Agent, or Firm* — Perkins Coie LLP

(57) ABSTRACT

The present application discloses a control circuit of a switching power converter, wherein the switching power converter comprises a power switch, and is configured to convert an input voltage into an output voltage, the control circuit comprises: a first time generating circuit configured to generate a first time signal; a phase lock circuit configured to generate a second time signal; and a switching signal generating circuit configured to generate a switching signal to control the ON and OFF switching of the power switch. The phase lock circuit generates the second time signal in accordance with the frequency difference between the switching signal and a reference clock signal, so as to get the frequency of the switching signal to be substantially equal to the frequency of the reference clock signal.

14 Claims, 6 Drawing Sheets

CONTROL CIRCUITS FOR SWITCHING POWER CONVERTERS AND ASSOCIATED METHODS

CROSS-REFERENCE TO RELATED APPLICATION(S)

This application claims the benefit of CN Application No. 201110185265.X, filed on Jul. 4, 2011, and incorporated herein by reference.

TECHNICAL FIELD

The present application generally relates to switching converters, and more particularly but not exclusively relates to constant on-time (COT) or constant off-time control switching converters and associated methods of controlling.

BACKGROUND

Commonly used techniques for controlling switching power converters comprise pulse width modulation (PWM), constant off-time control and COT control. In switching converters with COT control, external compensation network can be omitted, which simplifies the circuit design of the switching converters. Moreover, switching converters with COT control do not require an error amplifier to regulate the output voltage, so the transient response of the switching converters is improved.

FIG. 1 shows a prior step down converter 100 with COT control. The converter 100 comprises: an on-time generating circuit 101 configured to generate an on-time signal having an on-time TON of a switch P1; an off-time generating circuit 102, receiving a reference signal VREF and a feedback signal VFB, configured to generate an off-time signal having an off-time TOFF; a switching signal generating circuit 103, receiving the on-time signal and the off-time signal, operable to generate gate control signals HSDR and LSDR to control the ON and OFF switching of the transistors P1 and N1; a filter circuit, comprising an inductor L and a capacitor C1, configured to obtain a smooth output voltage VOUT; a feedback circuit, comprising resistors R1 and R2 connected in series, configured to obtain a feedback signal VFB.

For a step down converter, the duty cycle D of the converter can be expressed as:

$$D = \frac{T_{ON}}{T_{ON} + T_{OFF}} = \frac{V_{OUT}}{V_{IN}} \quad (1)$$

Wherein $T_{ON}$ is the on-time of the transistor $P_1$, $T_{OFF}$ is the off-time of the transistor $P_1$, and $V_{IN}$ is the input voltage of the converter 100.

According to equation (1), the switching frequency of the converter 100 can be expressed as:

$$F_{SW} = \frac{1}{T_{ON} + T_{OFF}} = \frac{V_{OUT}}{V_{IN}} \times \frac{1}{T_{ON}} \quad (2)$$

According to equation (2), the switching frequency of the converter circuit will be changed if the input voltage $V_{IN}$ or the output voltage $V_{OUT}$ of the converter 100 is changed. The variation of the switching frequency will cause EMI (electromagnetic interference), EMC (electromagnetic compatibility), noise and other multiple problems.

SUMMARY

In an embodiment of the present application, a control circuit of a switching power converter is disclosed. The switching power converter comprises a power switch, and is configured to convert an input voltage into an output voltage. The control circuit comprises a first time generating circuit, a phase lock circuit and a switching signal generating circuit. The first time generating circuit is configured to generate a first time signal. The phase lock circuit is configured to generate a second time signal. The switching signal generating circuit is coupled to the first time generating circuit and the phase lock circuit, wherein based on the first time signal and the second time signal, the switching signal generating circuit generates a switching signal to control the ON and OFF switching of the power switch. The phase lock circuit generates the second time signal in accordance with the frequency difference between the switching signal and a reference clock signal, so as to get the frequency of the switching signal to be substantially equal to the frequency of the reference clock signal.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

DETAILED DESCRIPTION

Reference will now be made in detail to the preferred embodiments of the application, examples of which are illustrated in the accompanying drawings. While the application will be described in conjunction with the preferred embodiments, it will be understood that they are not intended to limit the application to these embodiments. On the contrary, the application is intended to cover alternatives, modifications and equivalents, which may be included within the spirit and scope of the application as defined by the appended claims. Furthermore, in the following detailed description of the present application, numerous specific details are set forth in order to provide a thorough understanding of the present application. However, it will be obvious to one of ordinary skill in the art that the present application may be practiced without these specific details. In other instances, well-known methods, procedures, components, and circuits have not been described in detail so as not to unnecessarily obscure aspects of the present application.

Figure 1:
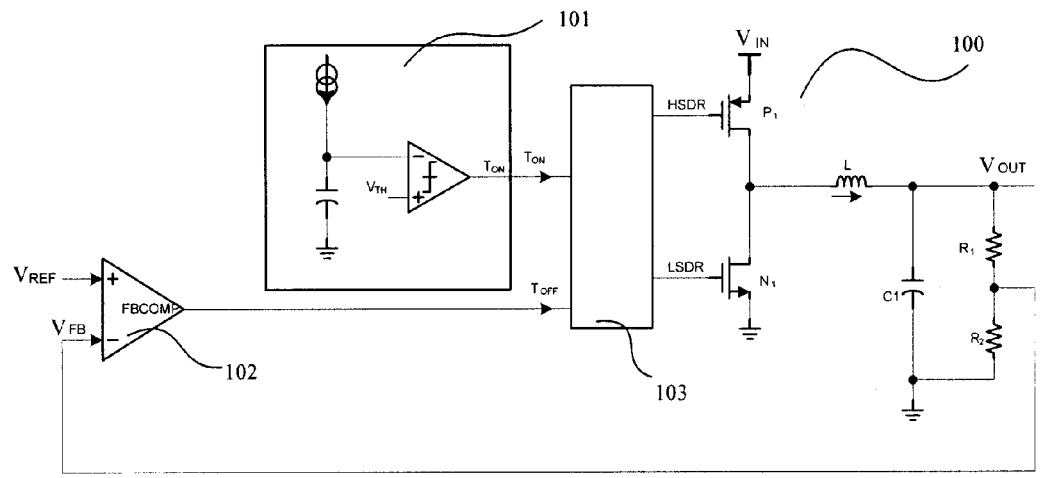
FIG. 1 shows a prior step down converter with COT control.
Figure 2A:
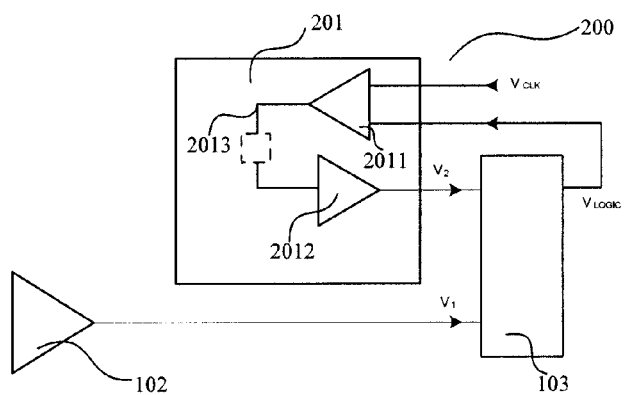
FIG. 2A shows a control circuit in accordance with an embodiment of the present application.

FIG. 2A shows a control circuit 200 in accordance with an embodiment of the present application. The control circuit 200 comprises: a first time generating circuit 102 configured to generate a first time signal V1; a phase lock circuit 201 configured to generate a second time signal V2; a switching signal generating circuit 103 configured to generate a switching signal VLOGIC based on the first time signal V1 and the second time signal V2; wherein the phase lock circuit 201 compares the switching signal VLOGIC with a reference clock signal VCLK and adjusts the second time signal V2 so as to get the frequency (or cycle) of the switching signal VLOGIC to be substantially equal to the frequency (or cycle) of the reference clock signal VCLK.

Figure 2B:
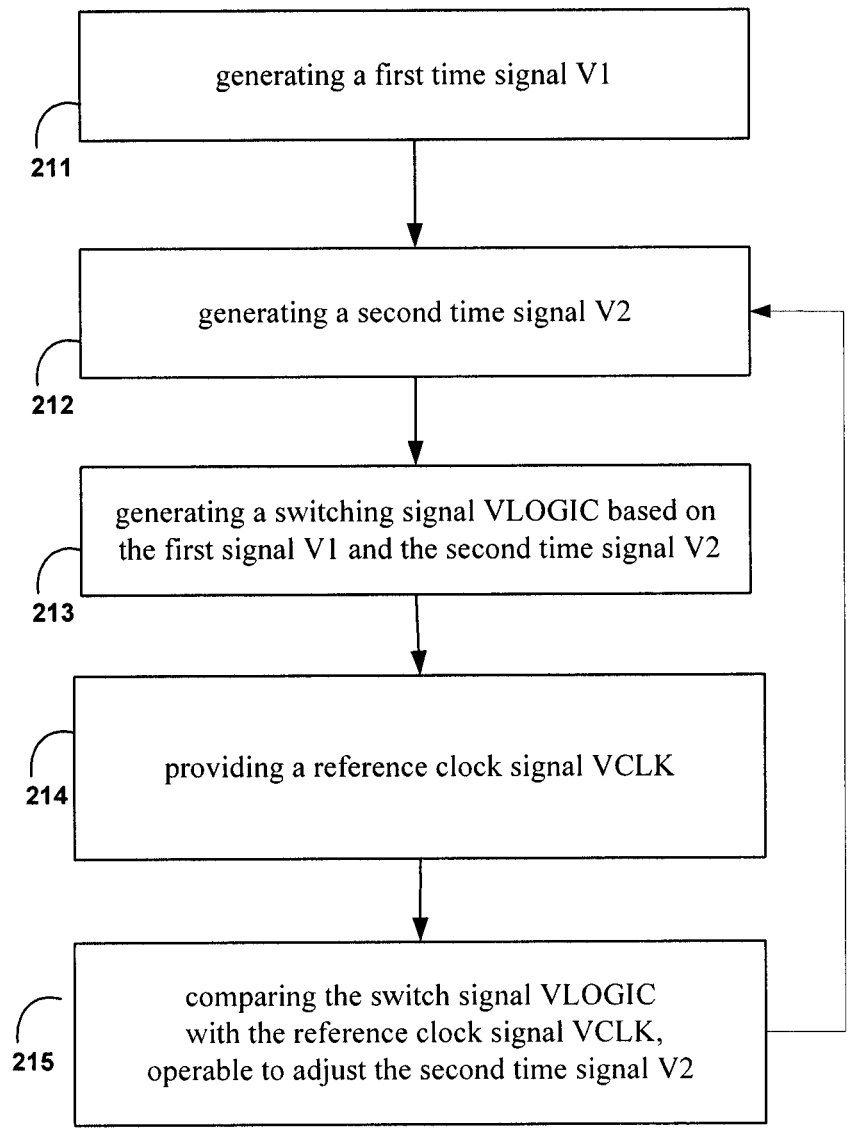
FIG. 2B is a flow chart of a control method in accordance with an embodiment of the present application.

FIG. 2B shows a flow chart of a control method in accordance with an embodiment of the present application. The control method comprises:

Step 211: generating a first time signal V1;
Step 212: generating a second time signal V2;
Step 213: generating a switching signal VLOGIC based on the first signal V1 and the second time signal V2;
Step 214: providing a reference clock signal VCLK;
Step 215: comparing the switch signal VLOGIC with the reference clock signal VCLK, and adjusting the second time signal V2, so as to get the cycle (or frequency) of the switching signal VLOGIC to be substantially equal to the cycle (or frequency) of the reference clock signal VCLK.

In an embodiment, a phase lock circuit is used to compare the switching signal VLOGIC with the reference clock signal VCLK and adjust the second time signal V2. The phase lock circuit may compare the cycle (or frequency) of the switching signal VLOGIC with that of the reference clock signal VCLK.

According to an embodiment of the present application, the switching signal VLOGIC is used to control the ON and OFF switching of a power switch. The power switch may be used in step down (buck), step up (boost), forward, and flyback converters. Energy is provided through ON and OFF switching of the power switch. In an embodiment, the switching signal VLOGIC is used to control the high side power switch of a buck converter.

According to an embodiment of the present application, the off-time of the power switch is controlled by the first time signal V1, the on-time of the power switch is controlled by the second time signal V2. According to another embodiment, the off-time of the power switch is controlled by the second time signal V2, the on-time of the power switch is controlled by the first time signal V1.

In accordance with an embodiment of present application, the first time signal V1 has an off-time TOFF that decides the off-time of the power switch, the second time signal V2 has an on-time TON that decides the on-time of the power switch. The sum of the off-time TOFF and the on-time TON is the switching cycle of the converter. In another embodiment, the sum of the off-time TOFF and the on-time TON has a fixed time difference TCON compared with the switching cycle of the converter.

In accordance with an embodiment of present application, the phase lock circuit 201 comprises: an error generating circuit 2011 configured to generate a first error signal 2013 based on the reference clock signal VCLK and the switching signal VLOGIC; a first comparator 2012 configured to adjust the second time signal V2 according to the first error signal 2013. In one embodiment, the first error signal 2013 is proportional or reverses proportional to the cycle (or frequency) difference between the switching signal VLOGIC and the reference clock signal VCLK. In one embodiment, the first error signal 2013 is increased when the cycle of the reference clock signal VCLK is larger than that of the switching signal VLOGIC. The first error signal 2013 is decreased when the cycle of the reference clock signal VCLK is smaller than that of the switching signal VLOGIC.

Figure 3:
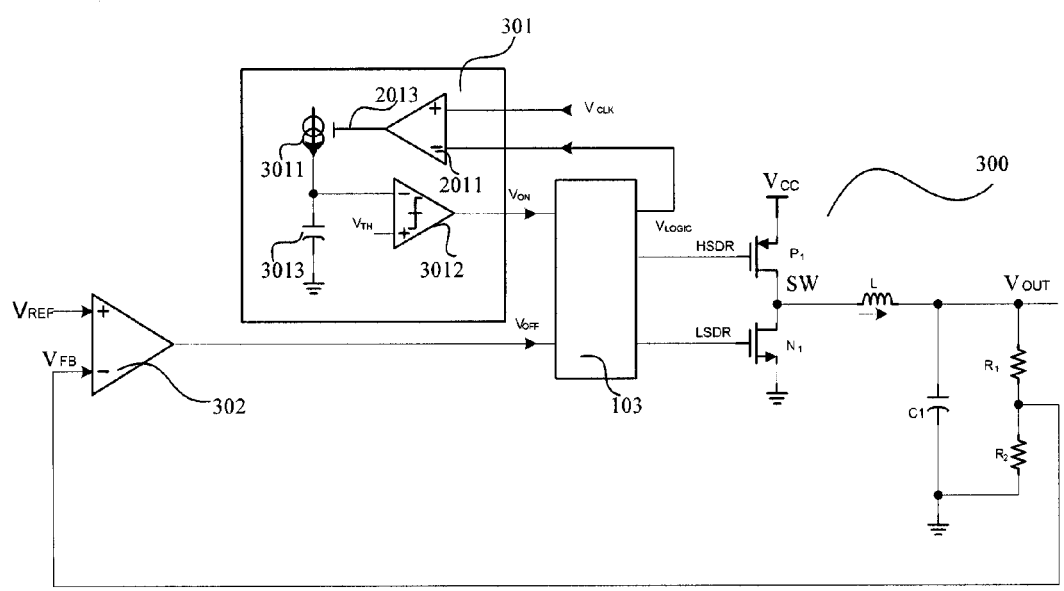
FIG. 3 shows a switching power converter in accordance with an embodiment of the present application.

According to an embodiment of present application, as shown in FIG. 3, the phase lock circuit 301 further comprises: a first controlled current source 3011 coupled to the first terminal of the first comparator 3012, wherein the first controlled current source 3011 is controlled by the first error signal 2013; a first capacitor 3013 coupled to the first terminal of the first comparator 3012; a second terminal of first comparator 3012 is coupled to a second reference signal VTH. The current of the first controlled current source 3011 is proportional or reverse proportional to the first error signal 2013.

In an embodiment, the phase lock circuit 301 further comprises a second controlled current source coupled to the first terminal of the first comparator 3012, wherein the current of the second controlled current source is controlled by the input voltage VIN and/or the output voltage VOUT. The current of the second controlled current source rises up when the difference between the input voltage VIN and the output voltage VOUT is increased. The current of the second controlled current source may be proportional to (VIN−VOUT) or (VIN/VOUT).

Figure 6:
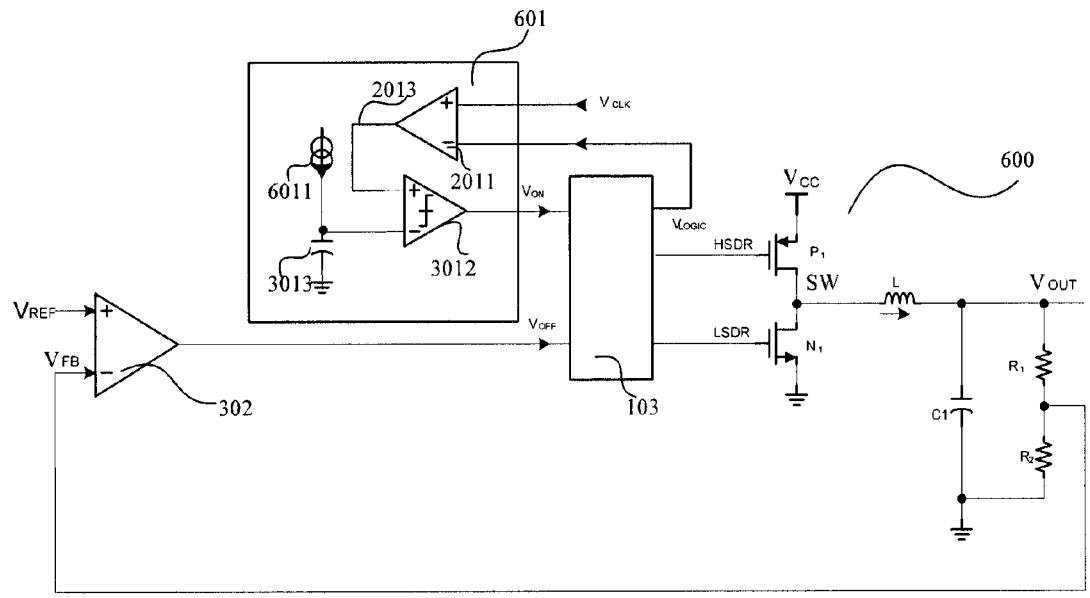
FIG. 6 shows a switching power converter in accordance with another embodiment of the present application.

In accordance with an embodiment of present application, as shown in FIG. 6, the phase lock circuit 601 further comprises: a first current source 6011 coupled to the first terminal of the first comparator 3012; a first capacitor 3013 coupled to the first terminal of the first comparator 3012; the second input terminal of the first comparator 3012 is coupled to the first error signal 2013.

Figure 8:
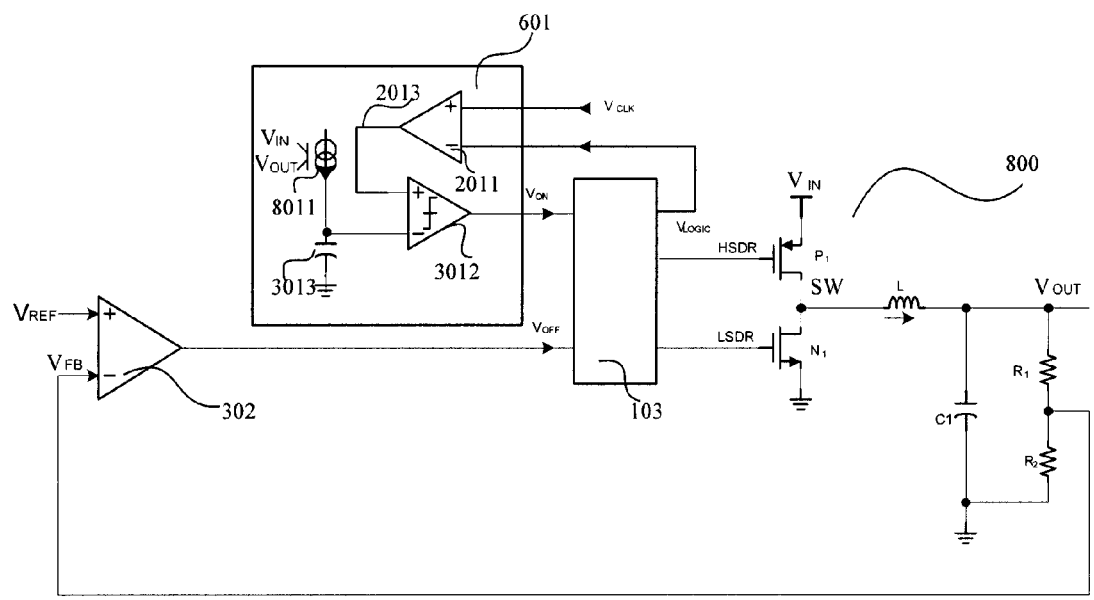
FIG. 8 shows a switching power converter in accordance with still another embodiment of the present application.

Referring to FIG. 8, the first current source 6011 comprises a second controlled current source, the current of the second controlled current source is controlled by the input voltage VIN and/or the output voltage VOUT. The current of the second controlled current source rises up when the difference between the input voltage VIN and the output voltage VOUT is increased. The current of the second controlled current source may be proportional to (VIN−VOUT) or (VIN/VOUT).

In an embodiment, the first controlled current source 3011 or the first current source 6011 or the second controlled current source 8011 comprises a PMOS transistor.

According to an embodiment of present application, the first time generating circuit 102 comprises: a second comparator having a first input terminal, a second input terminal and an output terminal, wherein the first input terminal is configured to receive a first reference signal VREF, the second input terminal is coupled to receive the output voltage VOUT of the switching power converter, wherein based on the first reference signal and the output voltage, the second comparator generates the first time signal at the output terminal.

FIG. 3 shows a switching power converter 300 in accordance with an embodiment of present application. converter 300 comprises:

Power switches P1 and N1 are controlled by the gate control signals HSDR and LSDR. In the embodiment shown in FIG. 3, the on-time and off-time refer to the on-time and off-time of the power transistor P1. In this embodiment, the power switch P1 is a PMOS transistor. In another embodiment, it can be realized by NMOS transistors, or PMOS transistors and NMOS transistors connected in parallel. The power switch N1 is a NMOS transistor. In another embodiment, JFET, IGBT transistors or Scotty diodes may also be used. In an embodiment, the switching signal VLOGIC can be used to control the ON and OFF switching of the power switch P1.

A filter circuit comprising an inductor L and a capacitor C1 is used to obtain a smooth output voltage VOUT. In the switching power converter 300, the power switch and the filter circuit is configured in a buck topology. In other embodiments, they can be configured in a boost, forward, or flyback topology.

A feedback circuit comprising resistors R1 and R2 is used to get a feedback signal VFB. In an embodiment, the output voltage VOUT can be sampled and used as the feedback signal VFB directly. In another embodiment, the output voltage VOUT may be converted into a feedback current signal IFB through a resistor. In some embodiments, in order to improve the transient speed, capacitors may be connected to the resistor R1 or R2 in parallel.

An off-time generating circuit 302 is coupled to a reference signal VREF and the feedback signal VFB. It is configured to generate an off-time signal VOFF. A phase lock circuit 301 is configured to generate an on-time signal VON. The switching signal generating circuit 103 generates a switching signal VLOGIC based on the on-time signal VON and the off-time signal VOFF.

In the power switching converter 300, the off-time generating circuit 302 and the phase lock circuit 301 are used to generate the off-time signal VOFF and the on-time signal VON respectively. In another embodiment, the off-time generating circuit 302 and the phase lock circuit 301 are used to generate the on-time signal VON and the off-time signal VOFF respectively. These substitutions are equivalent for persons skilled in the art, and do not depart from the scope of the present invention.

The phase lock circuit 301, also known as phase locked loop (PLL), allows the cycle (or frequency) of the signal VLOGIC to be substantially equal to that of the reference clock signal VCLK.

In addition, with regard to the specific description of PLL, one can refer to the book "Analog CMOS IC design" drafted by Razavi (Xi'an Jiao tong University Press house, the first edition, December 2002).

Figure 4:
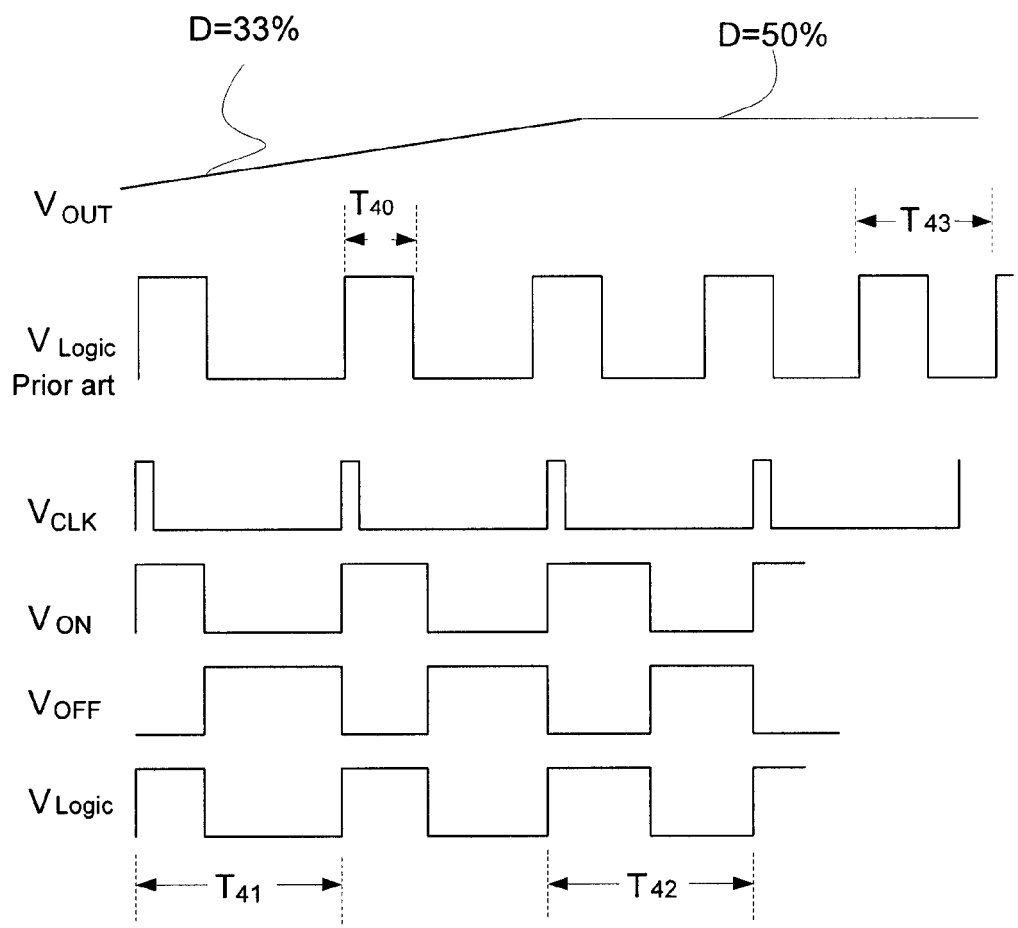
FIG. 4 shows operation waveforms of the switching power converter in accordance with an embodiment of the present application.

Referring to FIG. 4, the duty cycle of the switching power converter is 33% in period T41. The on-time is T40 while the off-time is 2*T40. The duty cycle would be changed into 50% due to the change of the output voltage VOUT. In the prior art, the off-time would be changed from 2*T40 to T40 since the on-time would not be changed. The cycle of the switching signal would be changed from 3*T40 to 2*T40 in period T43.

Referring to FIG. 4, a reference clock signal VCLK is provided. Due to the existence of phase lock circuit 301, the cycle of the switching signal VLOGIC would be substantially equal to that of the reference clock signal VCLK. Assuming the on-time signal VON and off-time signal VOFF are high valid, that is the high level of on-time signal VON decides the on-time of the power switch and the high level of the off-time signal VOFF decides the off-time of the power switch. Assuming at the beginning, the duty cycle is 33%, the on-time is T40 and the off-time is 2*T40. The duty cycle would be changed into 50% due to the change of the output voltage VOUT. Since the cycle is maintained constant, in the period T42, the on-time as well as the off-time would be changed to 1.5*T40.

Referring to FIG. 4, the sum of the on-time of the on-time signal VON (high level of on-time signal VON) and the off-time of the off-time signal VOFF (high level of off-time signal VOFF) is equal to the switching cycle. However, the sum of the above two time periods can also be longer or shorter than the cycle of the switching signal VLOGIC. For example, in an embodiment, a minimum on-time signal VPULSE may be added to or subtracted from the switching signal generating circuit 103. Switching cycle of the power switching converter would be the sum of above three time periods.

Continue to refer to FIG. 3, the phase-lock circuit 301 comprises an error generating circuit 3011 generating an error signal 2013 based on the cycles of the reference clock signal VCLK and the switching signal VLOGIC, and a first comparator 3012 adjusting the width of the on-time signal VON in accordance with the error signal 2013. The error generating circuit 3011, which is also known as a phase detector, is configured to convert the cycle difference between the reference clock signal VCLK and the switching signal VLOGIC into a voltage or current signal. In an embodiment, the first error signal 2013 decreases when the cycle of the switching signal VLOGIC is increased, the first comparator 2012 reduces the width of the on-time signal VON. The first error signal 2013 increases when the cycle of the switching signal VLOGIC is decreased, the first comparator 2012 increases the width of the on-time signal VON. In another embodiment, the first error signal 2013 increases when the cycle of the switching signal VLOGIC is increased, the first comparator 2012 reduces the width of the on-time signal VON. The first error signal 2013 decreases when the cycle of the switching signal VLOGIC is decreased, the first comparator 2012 increases the width of the on-time signal VON. In some embodiments, the first error signal 2013 is proportional to the cycle (or frequency) difference between the switching signal VLOGIC and the reference clock signal VCLK.

In an embodiment, the switching signal VLOGIC may be compared with the reference clock signal VCLK directly. In another embodiment, VLOGIC may be processed obtain a cycle equal signal VLOGIC1 having same frequency and different duty cycle. The cycle equal signal VLOGIC1 is compared with the reference clock signal VCLK. In other embodiments, a pulse signal may be added to or subtracted from the switching signal VLOGIC, so as to obtain a signal VLOGIC2. The signal VLOGIC1 is compared with the reference clock signal VCLK. These substitutions and changes are equivalent for ones skilled in the art, and do not depart from the scope of the present invention.

How to convert the cycle difference between the reference clock signal VCLK and the switching signal VLOGIC into the first error signal 2013, and how to adjust the width of the on-time signal VON based on the error signal 2013 are well known to ones skilled in the art. An optimized embodiment will be provided below.

Referring to FIG. 3, the switching power converter 300 further comprises a first controlled current source 3011 controlled by the first error signal 2013. The first controlled current source 3011 is decreased when the first error signal 2013 is increased. In an embodiment, the first controlled current source comprises a PMOS transistor controlled by the first error signal 2013. The capacitor 3013 and the first controlled current source are coupled to the negative terminal of the comparator. The discharge pathway of the capacitor 3013 is not shown. The positive terminal of the first comparator 3012 is coupled to a second reference signal VTH.

Figure 5:
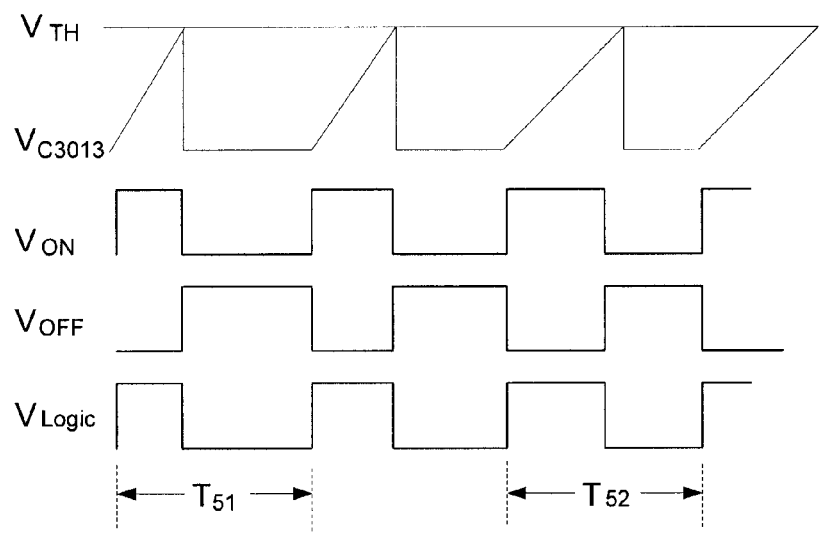
FIG. 5 shows operation waveforms of the control circuit in accordance with an embodiment of the present application.

Referring to FIGS. 3 and 4, the duty cycle needs to be increased in operation. In the prior art, the off-time TOFF will be reduced since the on-time TON is constant, which will reduce the cycle TLOGIC of the switching signal VLOGIC. According to an embodiment of the present application, the cycle difference between switching signal VLOGIC and the reference clock signal VCLK would be amplified by the error generating circuit 2011. The first error signal 2013 will rise up, the charge current of the controlled current source 3011 is decreased. Referring to FIG. 5, VC3013 is the voltage on the capacitor. In T51 period, the charge current decrease leads to a flip lag of the first comparator 3012. The on-time TON is increased, thus increasing the cycle of. In T52 period, duty cycle has changed from 33% to 50%, but cycle of switching signal VLOGIC has remained the same.

FIG. 6 shows a switching power converter 600 in accordance with an embodiment of present application. The phase lock circuit 601 of the converter 600 comprises a current source 6011 charging a capacitor 3013. The current source 6011 and the capacitor 3013 are coupled to the negative terminal of the comparator 3012. The first error signal 2013 is directly coupled to the positive terminal of the first comparator 3012.

Figure 7:
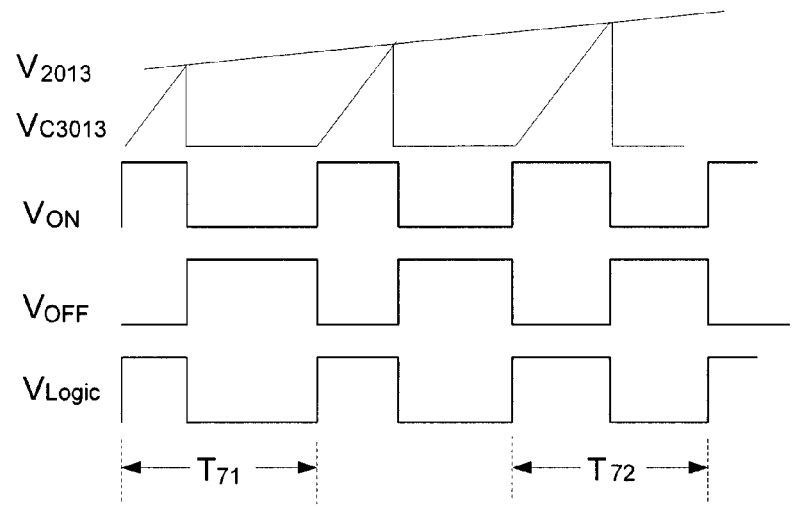
FIG. 7 shows operation waveforms of the control circuit in accordance with an embodiment of the present application.

Referring to FIGS. 6 and 7, compared with the prior art, in one embodiment of the present invention, the cycle difference of switching signal VLOGIC and the reference clock signal VCLK would be amplified by the error generating circuit 2011, and the first error signal 2013 would rise up. As a result, the voltage on the positive input terminal of the first comparator 3012 rises up while the charging current of the controlled current source 3011 is constant. As shown in FIG. 5, the voltage VC3013 on capacitance 3013 would take more time to reach the voltage V2013 on the positive input terminal, so the on-time TON increases, and further the cycle of the switching signal increases. In period T72, the duty cycle has changed from 33% to 50%, but cycle of switching signal VLOGIC remains unchanged.

The above described embodiments introduce PLL to COT type converter to avoid the variation of switching frequency caused by variation of input voltage VIN and/or the output voltage VOUT. However, PLL would begin to adjust the frequency after the switching frequency changed. To obtain a faster adjusting speed, in one embodiment, a positive feedback current may be utilized.

According to the equations (1) and (2), the cycle of the switching signal VLOGIC could be expressed as, $$T_{LOGIC} = T_{ON} + T_{OFF} = \frac{V_{IN}}{V_{OUT}} \times T_{ON} \quad (3)$$

As shown in FIG. 7, Assuming the charging current for capacitance 2013 is $I_{CH}$, the on-time $I_{ON}$ could be expressed as $$T_{ON} = \frac{V_{2013}}{I_{CH}} \quad (4)$$

According to (3) and (4), the cycle of the switching signal $V_{LOGIC}$ could be expressed as $$T_{LOGIC} = T_{ON} + T_{OFF} = \frac{V_{IN}}{V_{OUT}} \times \frac{V_{2013}}{I_{CH}} \quad (5)$$

According to equation (5), the cycle of the switching signal VLOGIC remains constant if the charging current ICH is proportional to quotient (VIN/VOUT) between the input voltage VIN and the output voltage VOUT.

Although the constant cycle of the switching signal VLOGIC may be obtained without PLL circuit 201 by utilizing the proper charging current ICH, it is hard to get a current exactly proportional to VIN/VOUT. So, it is hard to get a constant switching frequency by using this technology solely. On the other hand, the positive feedback current could greatly speed up the transient response since the current would change the cycle of the switching signal VLOGIC immediately once the input voltage VIN and/or the output voltage VOUT is varied. An embodiment utilizing both PLL and positive feedback would be introduced in the following text.

FIG. 8 shows a converter 800 according to an embodiment of present application. The difference between converter 600 and converter 800 is that the first current source 6011 is replaced by the second controlled current source 8011. In an embodiment, the second controlled current source 8011 have a linearity relationship with the quotient (VIN/VOUT) between the input voltage VIN and the output voltage VOUT. In other embodiments, the current of the second controlled current source is proportional with difference (VIN−VOUT) or quotient (VIN/VOUT) between the input voltage VIN and the output voltage VOUT. The switching frequency is decided by the PLL while the second controlled current source 8011 is configured to provide a faster response. So, it is not necessary to keep a linearity relationship between the current of the second controlled current source 8011 and the quotient (VIN/VOUT) between the input voltage and the output voltage.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control circuit of a switching power converter, wherein the switching power converter comprises a power switch, and is configured to convert an input voltage into an output voltage, the control circuit comprises:
a first time generating circuit configured to generate a first time signal, wherein the OFF-time of the power switch is controlled by the first time signal;
a phase lock circuit configured to generate a second time signal, wherein the ON-time of the power switch is controlled by the second time signal; and
a switching signal generating circuit coupled to the first time generating circuit and the phase lock circuit, wherein based on the first time signal and the second time signal, the switching signal generating circuit generates a switching signal to control the ON and OFF switching of the power switch;
wherein the phase lock circuit comprises an error generating circuit, the error generating circuit having a first input terminal, a second input terminal and an output terminal, wherein the first input terminal is configured to receive the reference clock signal, and wherein the second input terminal is coupled to the switching signal generating circuit to receive the switching signal, and wherein based on the frequency difference between the reference clock signal and the switching signal, the error generating circuit generates an error signal at the output terminal, and wherein the phase lock circuit adjusts the second time signal in accordance with the error signal, and wherein the phase lock circuit generates the second time signal in accordance with the frequency difference between the switching signal and a reference clock signal, so as to get the frequency of the switching signal to be substantially equal to the frequency of the reference clock signal.

2. The control circuit of claim 1, wherein the phase lock circuit further comprises:
a first controlled current source having a first terminal, a second terminal and a control terminal, wherein the first terminal is configured to receive a power supply voltage, the control terminal is coupled to the error generating circuit to receive the error signal;
a first capacitor coupled between the second terminal of the first controlled current source and the ground; and
a first comparator having a first input terminal, a second input terminal and an output terminal, wherein the first input terminal is coupled to the second terminal of the first controlled current source, the second input terminal is configured to receive a threshold voltage, wherein based on the threshold voltage and the voltage across the first capacitor, the first comparator generates the second time signal at the output terminal.

3. The control circuit of claim 1, wherein the phase lock circuit further comprises:
a first current source having a first terminal and a second terminal, wherein the first terminal is configured to receive a power supply voltage;
a first capacitor coupled between the second terminal of the first controlled current source and the ground; and
a first comparator having a first input terminal, a second input terminal and an output terminal, wherein the first input terminal is coupled to the output terminal of the error generating circuit to receive the error signal, the second input terminal is coupled to the second terminal of the first current source, wherein based on the error signal and the voltage across the first capacitor, the first comparator generates the second time signal at the output terminal.

4. The control circuit of claim 1, wherein the first time generating circuit comprises:
a second comparator having a first input terminal, a second input terminal and an output terminal, wherein the first input terminal is configured to receive a first reference signal, the second input terminal is coupled to receive the output voltage of the switching power converter, wherein based on the first reference signal and the output voltage, the second comparator generates the first time signal at the output terminal.

5. The control circuit of claim 2 wherein the phase lock circuit further comprises:
a second current source coupled to the first input terminal of the first comparator, wherein the second current source is configured to generate a second current related to the input voltage and/or the output voltage.

6. The control circuit of claim 3, wherein the first current source is configured to generate a first current related to the input voltage and/or the output voltage.

7. The control circuit of claim 5, wherein the second current rises up when the voltage difference between the input voltage and the output voltage is increased.

8. The control circuit of claim 5, wherein the second current rises up when the quotient between the input voltage and the output voltage is increased.

9. The control circuit of claim 6, wherein the first current rises up when the voltage difference between the input voltage and the output voltage is increased.

10. The control circuit of claim 6, wherein the first current rises up when the quotient between the input voltage and the output voltage is increased.

11. A switching power converter converting an input voltage into an output voltage, comprising:
a power switch;
a first time generating circuit configured to generate a first time signal, wherein the OFF-time of the power switch is controlled by the first time signal;
a phase lock circuit configured to generate a second time signal, wherein the ON-time of the power switch is controlled by the second time signal; and
a switching signal generating circuit coupled to the first time generating circuit and the phase lock circuit, wherein based on the first time signal and the second time signal, the switching signal generating circuit generates a switching signal to control the ON and OFF switching of the power switch, so as to convert an input voltage into an output voltage;
wherein the phase lock circuit comprises:
an error generating circuit, having a first input terminal, a second input terminal and an output terminal, wherein the first input terminal is configured to receive the reference clock signal, and wherein the second input terminal is coupled to the switching signal generating circuit to receive the switching signal, and wherein based on the frequency difference between the reference clock signal and the switching signal, the error generating circuit generates an error signal at the output terminal;
a first current source, having a first terminal and a second terminal, wherein the first terminal is configured to receive a power supply voltage;
a first capacitor coupled between the second terminal of the first controlled current source and the ground; and
a first comparator having a first input terminal, a second input terminal and an output terminal, wherein the first input terminal is coupled to the output terminal of the error generating circuit to receive the error signal, and wherein the second input terminal is coupled to the second terminal of the first current source, and wherein based on the error signal and the voltage across the first capacitor, the first comparator generates the second time signal at the output terminal; and
wherein the phase lock circuit generates the second time signal in accordance with the frequency difference between the switching signal and a reference clock signal, so as to get the frequency of the switching signal to be substantially equal to the frequency of the reference clock signal.

12. The control circuit of claim 11, wherein the first current source is configured to generate a first current related to the input voltage and/or the output voltage.

13. A method for controlling a switching power converter, wherein the switching power converter comprises a power switch, and is configured to convert an input voltage to an output voltage, the method comprises:
generating a first time signal, wherein the OFF-time of the power switch is controlled by the first time signal;
generating a second time signal, wherein the ON-time of the power switch is controlled by the second time signal; and
generating a switching signal based on the first time signal and the second time signal to control the ON and OFF switching of the power switch;
wherein generating the second time signal comprising:

generating an error signal based on the frequency difference between a reference clock signal and the switching signal; and adjusting the second time signal in accordance with the error signal, so as to get the frequency of the switching signal to be substantially equal to the frequency of the reference clock signal.

14. The method of claim 13, wherein the first time signal is generated based on a first reference signal and the output voltage of the switching power converter.

* * * * *